(12) United States Patent
Citron et al.

(10) Patent No.: US 8,479,055 B2
(45) Date of Patent: Jul. 2, 2013

(54) DETECTING AND OPTIMIZING FALSE SHARING

(75) Inventors: Daniel Citron, Haifa (IL); Moshe Klausner, Ramat Yishay (IL); Aharon Kupershtok, Ramat Gan (IL); Yousef Shajrawi, Nazereth (IL); Yaakov Yaari, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 12/780,904

(22) Filed: May 16, 2010

(65) Prior Publication Data

US 2011/0283152 A1 Nov. 17, 2011

(51) Int. Cl.
*G06F 11/00* (2006.01)
*G06F 13/00* (2006.01)
(52) U.S. Cl.
USPC .................................... 714/45; 711/125
(58) Field of Classification Search
None
See application file for complete search history.

(56) References Cited

U.S. PATENT DOCUMENTS

| | | | |
|---|---|---|---|
| 5,940,621 | A | 8/1999 | Caldwell |
| 6,360,361 | B1 | 3/2002 | Larus et al. |
| 6,457,107 | B1 | 9/2002 | Wynn et al. |
| 6,594,678 | B1 | 7/2003 | Stoutamire et al. |
| 7,093,081 | B2 | 8/2006 | DeWitt et al. |
| 7,114,036 | B2 | 9/2006 | DeWitt, Jr. et al. |
| 7,185,147 | B2 | 2/2007 | Illikkal et al. |
| 7,437,617 | B2 | 10/2008 | Al-Omari et al. |
| 7,496,908 | B2 | 2/2009 | DeWitt et al. |
| 7,496,909 | B2 | 2/2009 | Kuch et al. |
| 2005/0125613 | A1* | 6/2005 | Kim et al. ............... 711/125 |
| 2007/0239398 | A1* | 10/2007 | Song et al. ............... 702/186 |
| 2008/0282035 | A1 | 11/2008 | Hundt et al. |
| 2009/0125465 | A1 | 5/2009 | Berg et al. |

OTHER PUBLICATIONS

"Using Memory Tracing",URL: http://www.phys.utb.edu/numrel/cluster_dir/misc/UsersGuideHTML/node120.html.
Mahmut Kandemir et al., "Reducing False Sharing and Improving Spatial Locality in a Unified Compilation Framework", 2003. URL: http://www.ece.northwestern.edu/~choudhar/publications/pdf/KanCho03A.pdf.
Woo Hyong Lee, J. Morris Chang, "An integrated dynamic memory tracing tool for C++", 2002. URL: http://portal.acm.org/citation.cfm?id=777584.
Herb Sutter, "Eliminate False Sharing", 2009. URL: http://www.ddj.com/go-parallel/article/showArticle.jhtml? articleID=217500206.
Jaydeep Marathe, Frank Mueller, "Metric: Memory Tracing via Dynamic Binary Rewriting to Identify Cache Ineffciencies", . URL: http://www.csl.cornell.edu/~sam/papers/toplas07.pdf.
Shameem Akhter and Jason Roberts, "Understanding and Avoiding Memory Issues with Multi-core Processors", Dec. 11, 2008. URL: http://www.ddj.com/embedded/212400410.
Patrick Lardieri,"Cache False-Sharing in Multi-Core Architectures", 2008. URL: https://www.sprucecommunity.org/Lists/Challenge%20Problems/DispForm.aspx?ID=44.
HP, "Parallel Programming Guide for HP-UX Systems", 1998. (for specific page use URL): http://docs.hp.com/en/B6056-96006/ch13s02.html.

* cited by examiner

*Primary Examiner* — Hyun Nam
(74) *Attorney, Agent, or Firm* — F. Jason Far-hadian; Century IP Group

(57) ABSTRACT

Systems and methods for cache optimization are provided. The method comprises tracing objects instantiated during execution of a program code under test according to type of access by one or more threads running in parallel, wherein said tracing provides information about order in which different instances of one or more objects are accessed by said one or more threads and whether the type of access is a read operation or a write operation; and utilizing tracing information to build a temporal relationship graph (TRG) for the accessed objects, wherein the objects are represented by nodes in the TRG and at least two types of edges for connecting the nodes are defined.

25 Claims, 9 Drawing Sheets

```
int n;

int x,y,z,w;

void *threadfunc(void *pram)
{
    int * varP = (int *)pram;
    int i,j;
    printf("Debug: varP = %d, *varP = %d, *varP = %d\n",varP,*varP,*varP);

for (j=0; j < n; j++)
    for (i=0; i < n; i++)
    {
        *varP += 1;
    } printf ("in threadfunc, *varP=%d\n",*varP);
    /* pthread_exit(0); */
}
```

*FIG. 6*

DETECTING AND OPTIMIZING FALSE SHARING

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to multiprocessor memory hierarchy and, more particularly, to a system and method for detecting and optimizing access to memory that may result in false sharing using a temporal relationship graph, for example.

BACKGROUND

In general, false sharing (FS) is a harmful by-product of multithreaded applications running on multiprocessor (including multi-core) architectures. FS can have adverse implication on performance in that FS is a performance degrading usage pattern that arises in systems with distributed, coherent caches at the size of the smallest resource block managed by the caching mechanism.

Cache coherence (i.e., cache coherency) refers to the consistency of data stored in local caches of a shared resource. Cache coherence is a special case of memory coherence. When clients in a system maintain caches of a common memory resource, problems may arise with inconsistent data. This is particularly true of CPUs in a multiprocessing system. Referring to FIG. 1, for example, if client 1 has a copy of a memory block in memory resource 100 from a previous read and client 2 changes that memory block, client 1 could be left with an invalid cache of memory without any notification of the change. Cache coherence is intended to manage such conflicts and maintain consistency between cache and memory. The coherency is typically accomplished at cache block or cache line level.

When a first client or other system participant attempts to periodically access data that will never be altered by a second client or party, but that data shares a cache block with data that is altered, the caching protocol may force the first client to reload the whole block despite a lack of logical necessity, thus the reference to the term False Sharing. The caching system is unaware of the precise activity within this block and forces the first client to bear the caching system overhead required by true shared access of a resource.

As such, FS is typically a concern in multiprocessor CPU caches, where memory is cached in lines of some small power of two word size (e.g., 64-byte lines aligned on 64-byte boundaries), for example. If two processors operate on independent data in the same memory address region storable in a single line, the cache coherency mechanisms in the system may force the whole line across the bus or interconnect with every data write, forcing memory stalls in addition to wasting system bandwidth.

FS is an inherent artifact of automatically synchronized cache protocols and can also exist in environments such as distributed file system or databases. The main prevalence, however, is in multiprocessor memory hierarchy sub-systems, where memory data is replicated and resides in the caches of several CPUs. Memory data is placed in a cache at the granularity of a cache line.

By way of example, false sharing happens, when CPU X writes to object A in a cache line also containing object B. This action invalidates cache lines in other CPUs (e.g., CPU Y) that contain copies of corresponding memory object B. Thus, when CPU Y accesses object B a cache miss occurs with the penalty of having to retrieve the data from a lower and slower memory level or from another cache with coherent data. It is noteworthy that CPU Y doesn't write to object B. The sharing is an artifact of the memory implementation. The above anomaly is referred to as False Sharing, as there is sharing in the cache lines but no sharing on the objects within the cache line.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a computer implemented cache optimization method comprises tracing objects instantiated during execution of a program code under test according to type of access by one or more threads running in parallel, wherein said tracing provides information about order in which different instances of one or more objects are accessed by said one or more threads and whether the type of access is a read operation or a write operation; utilizing tracing information to build a temporal relationship graph (TRG) for the accessed objects, wherein the objects are represented by nodes in the TRG and at least two types of edges for connecting the nodes are defined.

A first type of edge uni-directionally connects a first node to a second node to indicate that a thread accessed a first object and another thread wrote to the second object in a temporal proximity, wherein a second type of edge non-directionally connects a first object to a second object to indicate that the first and the second objects were accessed in temporal proximity by the same thread or by two different threads but only for read operations, wherein a weight is assigned to the edge of the first type, and said weight is incremented each time one thread accesses the first object and another thread writes to the second object, and wherein a weight is assigned to the edge of the second type, and said weight is incremented each time the first and second objects are accessed in temporal proximity.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

FIG. 6 is a sample program that exhibits a high rate of false sharing memory accesses in accordance with one embodiment.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In accordance with one embodiment, in order to detect and optimize false sharing (FS) in an application or program under test, the application is instrumented so that for each operation (e.g., each read or write) that requires access to a shared resource (e.g., memory), a record comprising the target address, type of access, and thread ID is generated. Interleaved access requests submitted by a plurality of executed threads are traced and recorded to form a memory access trace.

The trace may be fed into a post-processor in real time to translate the memory address trace to a memory object access trace using a pre-loaded symbol table that is obtained from the executable code, for example. In one embodiment, the objects are fed to a queue that simulates a fully associative cache. For example, an object X in location i in the queue (where i=1 is the head of the queue) which is accessed by thread T, where thread T performs an operation A (e.g., read or write), may be represented as $X_i(T,A)$. As such, $X(T,A)$ represents a newly encountered data access.

A potential FS situation may occur if an instance $X_i(T,*)$ exists in the queue and a new instance of the object $X(T,*)$ is encountered, where both instances were accessed by the same thread T, and there exists another object $Y_j(T',W)$, such that $T'!=T$ and $j<i$, meaning that another thread, T', writes to another object Y between two accesses to X by thread T. In the above scenario, there is the risk that if the two objects, X and Y, are mapped to the same cache line and the two threads T and T' are mapped to different CPU's, then FS may occur resulting in a high-cost access to fetch X from memory during the second access to X by thread T.

Figure 5:
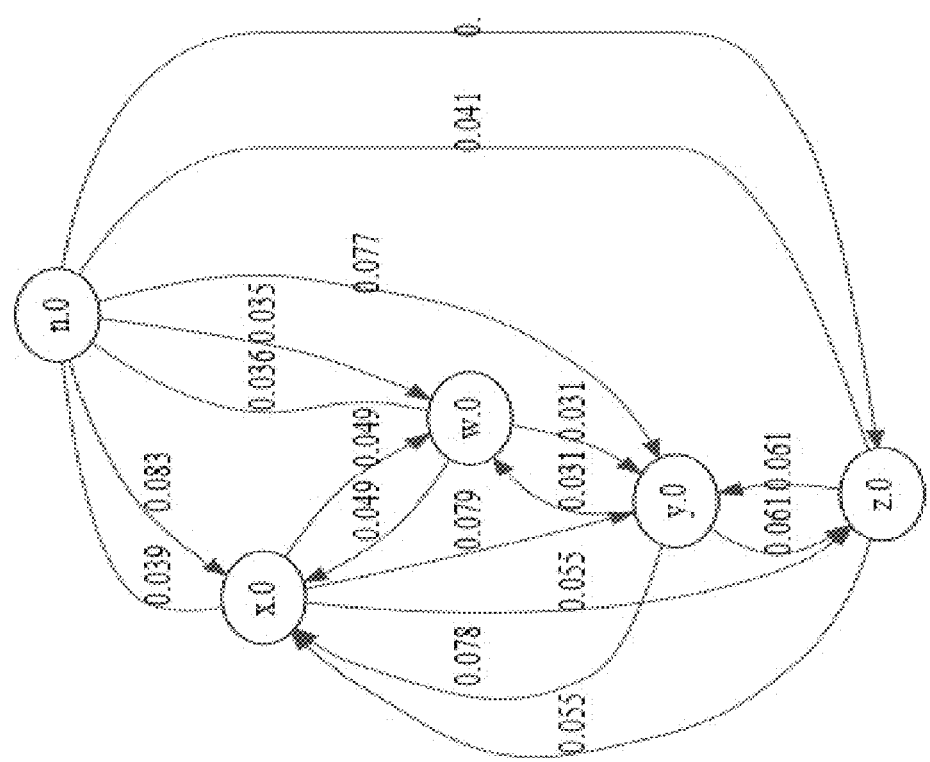
FIG. 5 is a diagram of an exemplary temporal relationship graph (TRG), corresponding to the program in FIG. 6, in accordance with one embodiment.

In accordance with one embodiment, for each such $\{X_i, Y_j\}$ pair, the nodes X and Y are added to a temporal relationship graph (TRG), if nodes X and Y are not in the TRG already (see FIG. 5 for an example of a TRG). Further, a direct edge is added from X to Y in the TRG with a weight of the edge set to 1 initially. Otherwise, if the edge already exists in the TRG, the edge's weight is incremented when an $\{X_i,Y_j\}$ pair is encountered during the execution of the program under test. As provided in further detail below with reference to FIGS. 5 and 6, each directed edge reflects a potential FS situation. If X and Y are in the same cache line, a write to Y will cause a FS access penalty when X is accessed by the same thread running on another CPU.

As provided in further detail below, a TRG, in one embodiment, is implemented to keep an edge between two temporally proximate objects. Objects larger than a cache line may be split to sequence of chunks each the size of a cache line. Uniformly smaller objects may be referred as chunks also. These chunks are the basic units managed in the TRG.

Temporal proximity in this context refers to the relative proximity in the order of occurrence or event sequence in which two objects are accessed or a request for accessing the two objects is received. In other words, temporal proximity indicates that the number of objects separating two objects is small. The actual time passed is of no importance. Two objects may be deemed temporally close or temporally proximate, if the number of objects separating the two is below a predefined threshold. This threshold may be determined by the size of the queue referred to above.

Depending on implementation, an edge connecting two objects in the TRG may be associated with a number that represents the cost of having a cache miss in the cache when accessing the two chunks. The more frequent the temporal proximity of the two chunks, the higher the cost.

Managing the chunks in the TRG allows greater precision when evaluating the cost of a given memory allocation within a given TRG since it allows detection of FS threats within a single object. In addition, more precise information may be provided to the compiler or developer on a possible FS, if source changes are needed. In one embodiment, the TRG is computed in real-time by incrementing the program under test so that memory accesses form a memory trace including memory trace records or requests. The requests are processed to identify the containing object and chunk number, and are then fed into a queue that represents a fully-associative data cache of size S as illustrated in the exemplary block diagram in FIG. 2.

Figure 1:
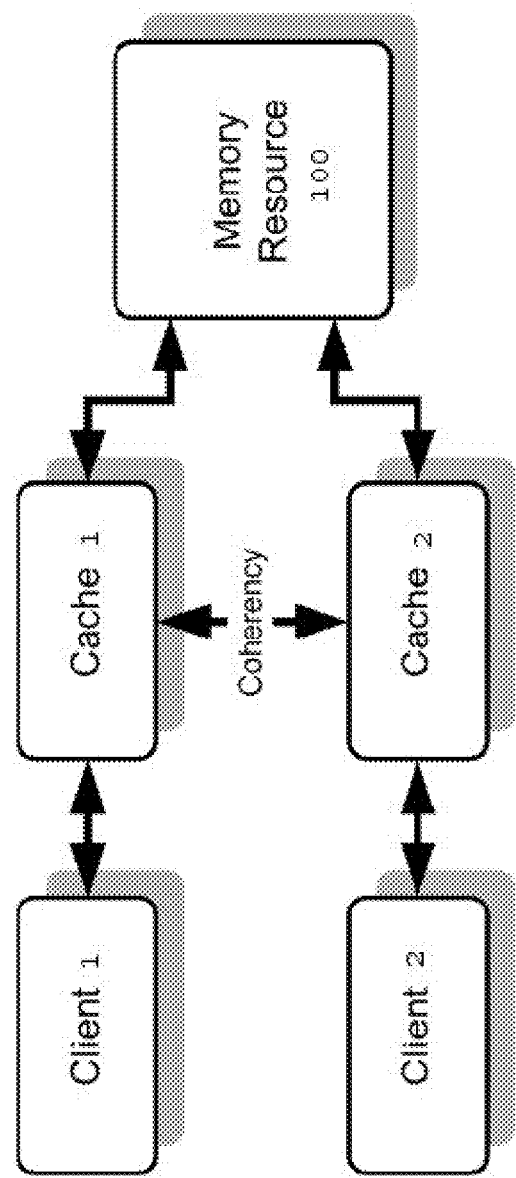
FIG. 1 illustrates an exemplary system environment block diagram in accordance with one or more embodiments.
Figure 2:
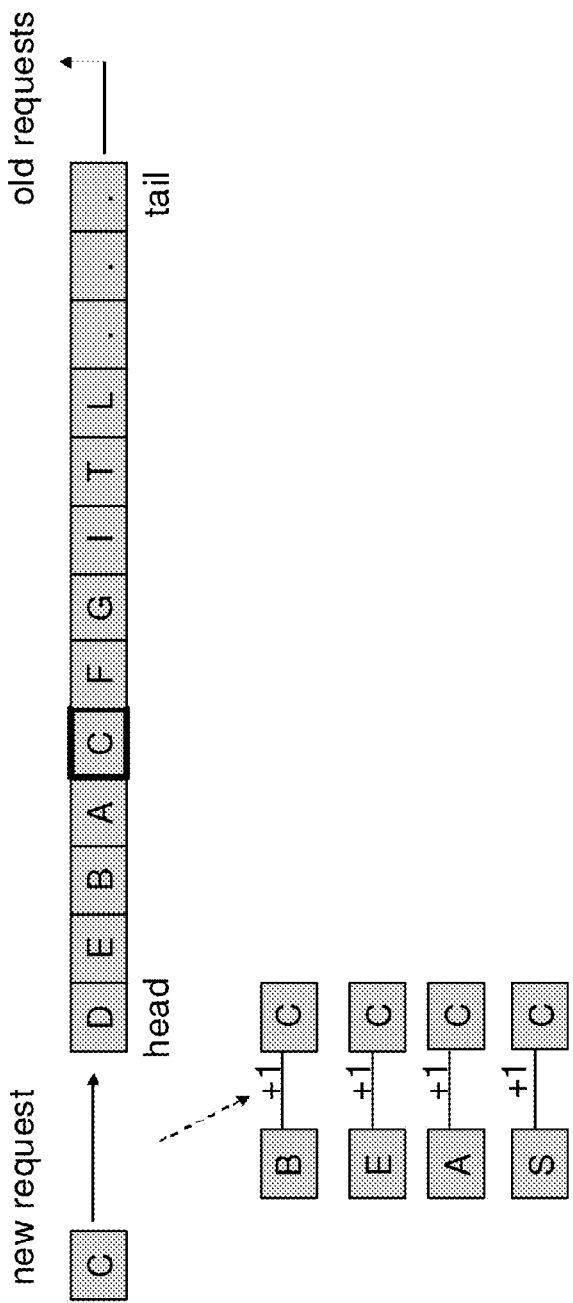
FIGS. 2 through 4 are an exemplary request queue during different cache access states, in accordance with one embodiment.

Referring to FIG. 2, when a request for accessing an object C is received, the queue is searched for an instance of object C. If an existing object C already exists in the queue, the object chunks between the existing object C and the head of the queue are considered competitors for the same cache line. As such, each edge between object C and each of objects B, E, A, and S is incremented by 1, for example. As a result, the TRG will reflect heavy edges between chunks that may be allocated spatially close in proportion to the weight of the edge. Such an allocation ensures that when a request for accessing object C arrives, the earlier objects B, E, A, or S will not be evicted from the cache, and that the C request will result in a cache hit.

Figure 3:
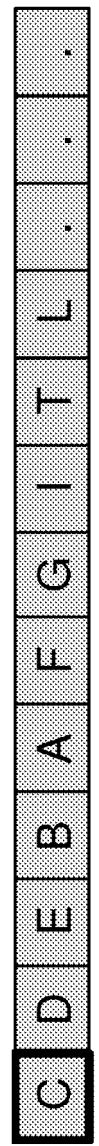

FIG. 3 is an exemplary block diagram of the queue, after incrementing the edges. As shown, the older instance representing object C is removed and a new instance C is placed at the head of the queue. In one embodiment, if C isn't in the queue, adding C to the head of the queue may overflow the queue. Therefore, object chunks from the tail end may be removed until the total queue size is reduced below the cache size S.

In one embodiment, in order to identify the containing object of a memory request, the object that contains the requested memory address may be statically or dynamically allocated. The list of statically allocated objects is read at initialization time by analyzing the symbol table of the executable program, for example. The static object of a given memory address may be identified by way of a binary search or other methods, for example.

To identify the dynamic objects, a memory trace may include records for heap allocation (e.g., malloc( ) and release (e.g., free( ). These records identify the calling site that performs the allocations, so that at optimization time the allocator may be instructed to place the object with the proper alignment. A unique identification of the calling site may be performed by, for example, XOR'ing the N last return addresses, at the point where 'malloc' was called, taken from the stack. In one implementation, N may be set to 4.

The TRG may be extended to support multi-threading and detect FS, in accordance with one embodiment. For example, when the same cache line is accessed from different cores (or CPUs) a FS may occur. According to the above model, the following changes may be implemented:

Each object chunk in the queue may be associated with a thread ID that made the access request.

If a case is detected where two requests for accessing C are submitted from the same thread and other writes are performed by another thread, it is desirable to ensure that when another request for accessing C is received, that request will result in a cache hit. Such writes, when performed by a thread running on another core, may not invalidate the cache line containing C.

Figure 4:
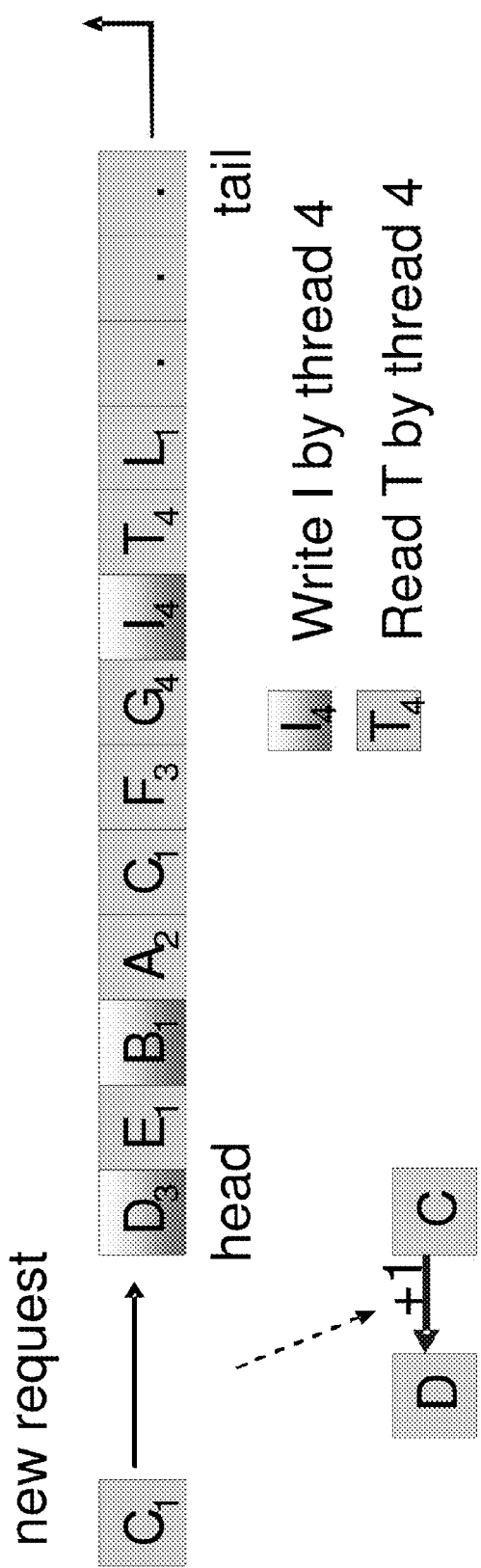

The above scenario is illustrated in FIG. 4, where a new C request finds a write operation to D by a thread 3, for example. Such a write may cause invalidation of the lines containing D in all other caches. As such, it is desirable for C to be in a different cache line than D. This is indicated by, for example, generating and incrementing an edge between C and D (see the arrow going from C to D). As provided in further detail below with reference to the TRG illustrated in FIG. 5, each such edge is directional and not symmetric, indicating (pointing to) the node that performs the write operation.

More particularly, referring to FIG. 5, a directional arrow going from one node, for example representing an object A, to another node, for example, representing an object B in the TRG, represents that object A was accessed by one thread, followed by a write operation to object B by another thread. In the exemplary illustration in FIG. 5, n is a read-only object (no edge pointing to it), while x, w, y, z are objects that are read from and written to by different threads.

In the sample program shown in FIG. 6, four threads are created (thread creation is not shown). The threads run in parallel and each repeatedly reads n and then reads and writes to one or more objects x, w, y or z (see FIGS. 5 and 6). This process results in false sharing edges in both directions between each of x, w, y and z, as well as edges from n to each of the four objects because n is being read from and not written to. The numbers on the edges are the relative weight of the edge, as provided in more detail below.

The arrow going from n to x, for example, indicates that a first thread read from n and a second thread wrote to x at about the same time. The exemplary TRG illustrated in FIG. 5 does not show whether the objects are in the same cache line, but shows the potential for a FS, if the objects happen to be on the same cache line. The non-directional lines indicate that the connected objects were accessed (read or written) in temporal proximity by the same thread. For example, the non-directional line between n and x indicates that the same thread made many temporally close accesses to x and n. In addition, non-directional lines are used when the two objects are accessed by different threads but only for read operations.

According to the exemplary TRG graph in FIG. 5, a program under test may be instrumented so that objects that do not have a potential for FS are associated with the same cache line, and objects that have a high potential for FS are associated with different cache lines. In this example, x, w, y, and z are shown to have a heavy traffic of writes by different threads. This means that the potential for FS between these exemplary four objects is very high. For that reason, it would be prudent to associate each of said objects to a different cache line.

Figure 7A:
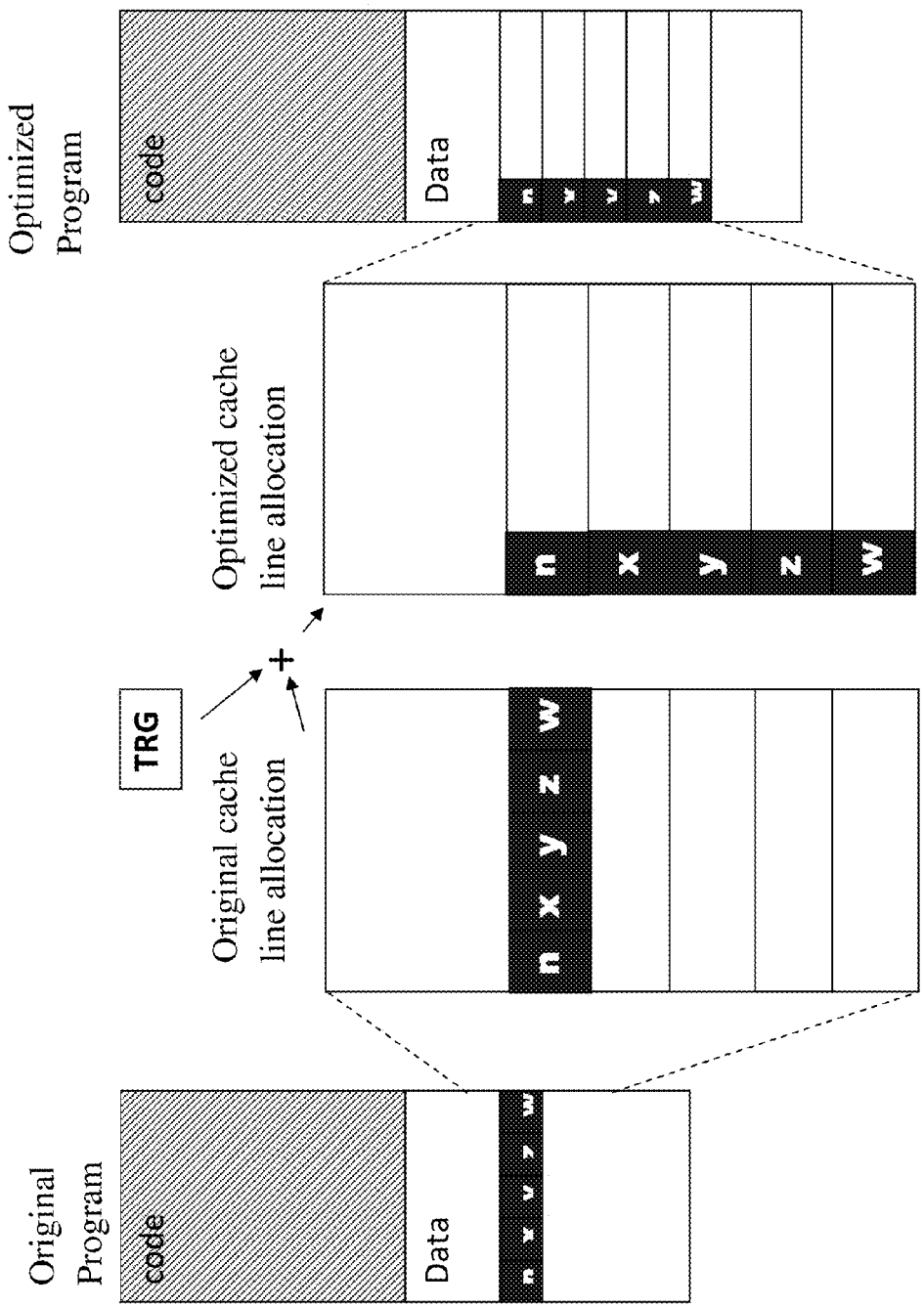
FIG. 7A illustrates a block diagram that represents a TRG-based optimization process in accordance with one embodiment.

Accordingly, when an application instrumented based on the above teachings completes execution, the resulting TRG reflects the FS threats between the different objects. Referring to FIGS. 5, 6 and 7A, a TRG may represent that n and x were accessed by the same thread. However, since the same is true for n and w, n and y, and n and z, and since each of w, x, y and z may be desirably placed in a different cache line, it would be prudent to have n in a different cache line than either of the above four objects. Using a similar approach, x, y, z and w may need to be assigned to different cache lines, as illustrated in FIG. 7A, where the left two blocks represent the original program code with original cache line allocation, and the right two blocks represent the optimized program code with optimized cache line allocation.

In summary, for an object O2, which has a heavy edge pointed to it from another object O1, it would be desirable to re-allocated object O2 to a different cache line than the cache line to which O1 is allocated. This re-allocation helps minimize or eliminate the potential for FS between objects O1 and O2. In one embodiment, the re-allocation is accomplished by, for example, statically modifying the original executable code, reallocating the static data and updating the references to the data inside the application code.

In one embodiment, the references may appear in the form of relocation records, generated by the compiler that accompanies the executable program and provides a linker program with information about location of the data. In some operating systems, keeping the relocation information after the linkage step may require that a flag to be set. The flag instructs the linker program that the relocation information, which it used to relocate the program to its final location, should not be discarded but rather kept in the resulting program for use by post-link tools.

Figure 7B:
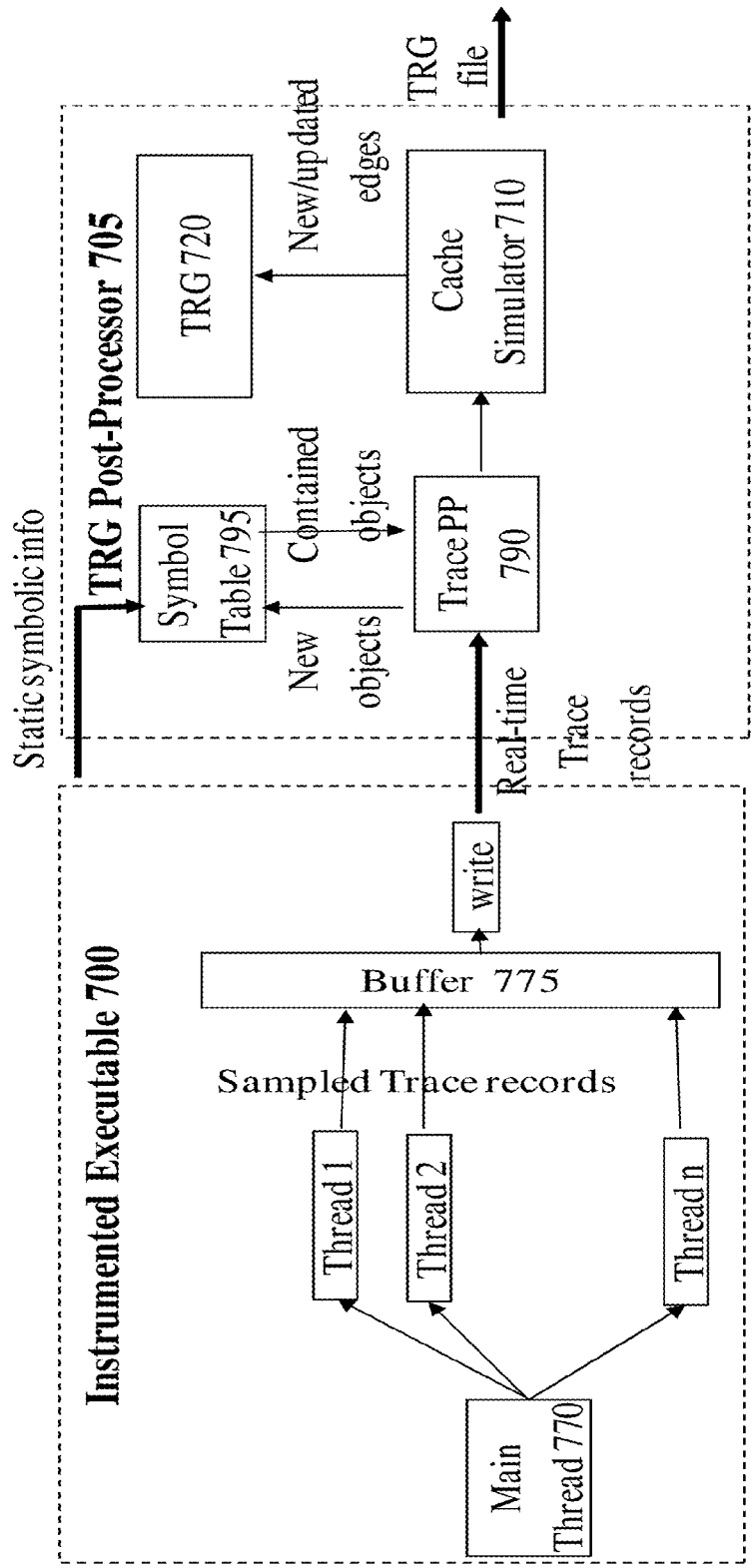
FIG. 7B is a block diagram showing how an instrumented code may be used to trace access to objects that may result in false sharing, in accordance with one embodiment.

Referring to FIG. 7B, for example, the false sharing detection and optimization may be accomplished by:

Creating a memory trace by way of instrumentation of the code for the program under test to generate sampled trace of memory accesses (see block titled "instrumented executable" 700);

Constructing and updating a queue that simulates the cache shown in FIG. 7B (see the block titled "TRG post-processor" 705);

Creating a TRG based on the queue (i.e., the cache simulator 710)—the arrow from the cache simulator 710 to the TRG 720 indicates creation and update of edges in the TRG.

As shown in FIG. 7B, sample trace records are combined from executing different but concurrently running threads emanated from a main thread 770. The traced records are added to a buffer 775 where the records are serialized to form a single stream. The serialized records are processed by a trace post-processor (traced PP) 790 in order to retrieve containing objects from a symbol table 795.

As such, using the TRG, a potential FS may be accurately detected by real-time analysis of the memory access trace generated by multiple threads of the instrumented program code. The result of the analysis in form of a TRG provides the details of one or more FS threats as exposed by the traces in the TRG. Other currently implemented approaches that are based on incomplete performance monitoring counters (PMC) information, or assume loop pattern, or look for actual FS situations in a given test are incomplete or dependent on specific thread or CPU allocation and workload information.

Based on the information in the TRG, static and dynamic optimization may be performed to avoid high-risk FS situations. Further, when source changes are needed, the TRG information may provide hints to a programmer or compiler. In either case, no real-time cost is associated with the optimization as in some of the current approaches when real-time code modifications are performed.

In one embodiment, false sharing may be optimized when the TRG with FS edges is available. Optimization provides for each heavily threatening object (i.e., the end node of the heavy FS edge) to be mapped to a separate cache line containing the object and possibly other objects not connected to it with FS edges. In statically allocated scalar objects, the optimization may be performed by a post-link optimization tool which reads and rewrites the binary and reassigns the virtual addresses to provide for the threatening objects to be aligned on cache line boundary.

Scalar data may be allocated to the heap, when each heap object X is associated with a site S(X) where the object was allocated. A custom 'malloc' library may be defined so that if there is a FS threat between S(X) and S(Y), then:

If S(X) !=S(Y), the object instances of S(X) and S(Y) is allocated from distinct memory pools If S(X)==S(Y), consider alignment of objects X belonging to S(X) on a cache line boundary (depending on size of X and strength of edge)

In case of structured objects, the threatening objects may be components of a larger object and the alignment requests may be contradictory. In such a case, the user or compiler may be provided with recommendations for splitting or restructuring the large object. Accordingly, a method for detecting false sharing between objects in an executable file is provided. Actual false sharing scenarios may be collected at the same time to avoid identifying true sharing cases as false sharing events. The method also detects potential false sharing based on a representative workload used in a training phase, for example. A representative workload may be designed so that potential FS cases exclude scenarios that are of no interest during a test run.

In one embodiment, the proposed method involves a profile gathering phase which requires the code to be instrumented to intercept one or more, and in certain embodiments, every load and store instruction in the code. A heavy burden may result from monitoring each load or store instruction and from post-processing of the trace in real time. This burden may increase the load on the executable producing the memory trace. To reduce this pressure, a K-of-N sampling may be employed, where the instrumented code runs free for N loads or stores and then actually monitors and process the next K loads or stores, i.e., performs 1:(N/K) sampling.

In one embodiment, a high correlation (e.g., error is below 0.5%) between 1-1 (full monitoring), and 1001-of-10000 up to 1001-of-200,000 for heavy workloads (i.e., 1:10 to 1:200 sampling) were determined. By default 1001-of-10,000 sampling (1:10) were performed. The 1001 sampling (instead of 1000) was to avoid synchronization effects between the free and monitoring phases.

The above exemplary scheme for detecting and optimizing FS is more efficient than techniques that depend on first detecting FS in order to avoid FS later. Such approaches require dynamic adaptation either by hardware (to identify and prevent) or by software (for changing relation between objects). However, FS detected in one run may not be seen on another run of the application with different inputs. And even if FS isn't detected, FS may occur in future runs. Notably, unless configured in a certain way, a thread may run on any CPU as scheduled by the OS and thus cause or avoid a FS situation. The approach provided here, advantageously, does not rely on actual FS events but rather anticipates FS events and attempts to avoid actual FS regardless of the specific scheduling of threads to CPUs.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 8A:
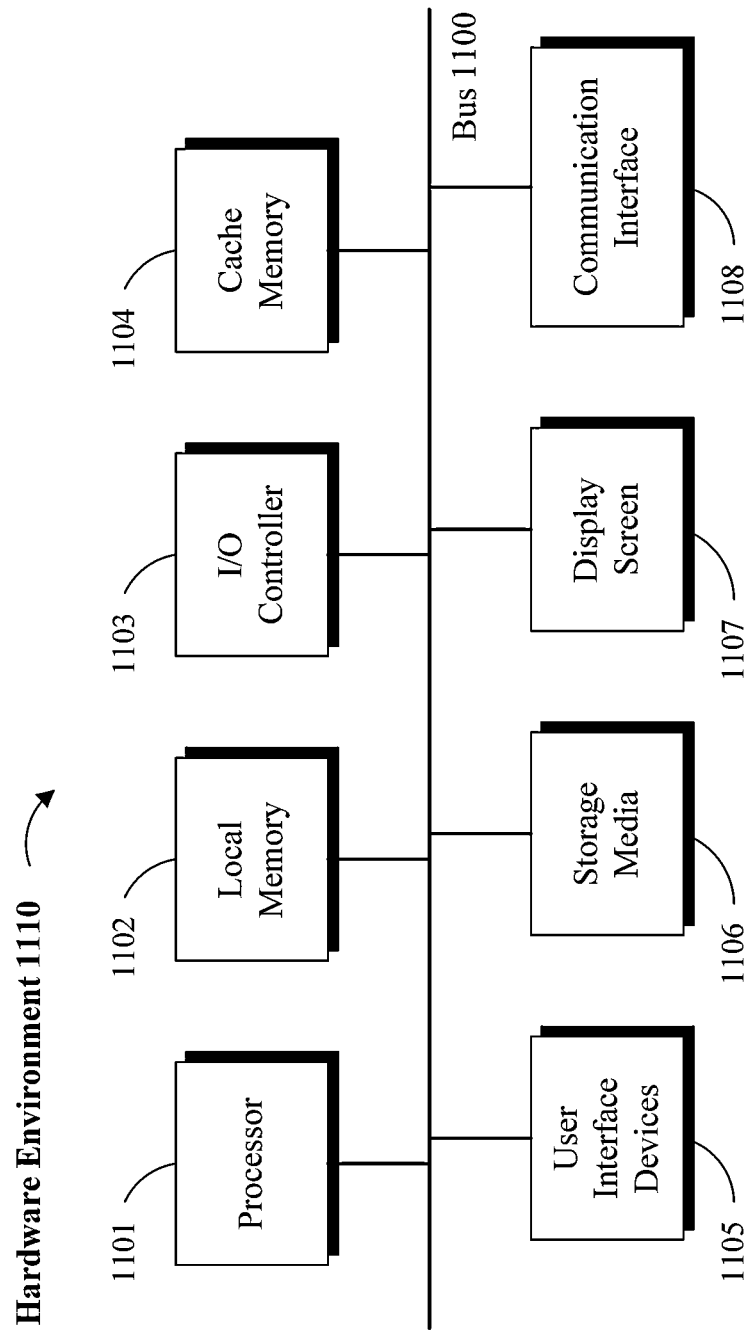
FIGS. 8A and 8B are block diagrams of hardware and software environments in which the disclosed systems and methods may operate, in accordance with one or more embodiments.
Figure 8B:
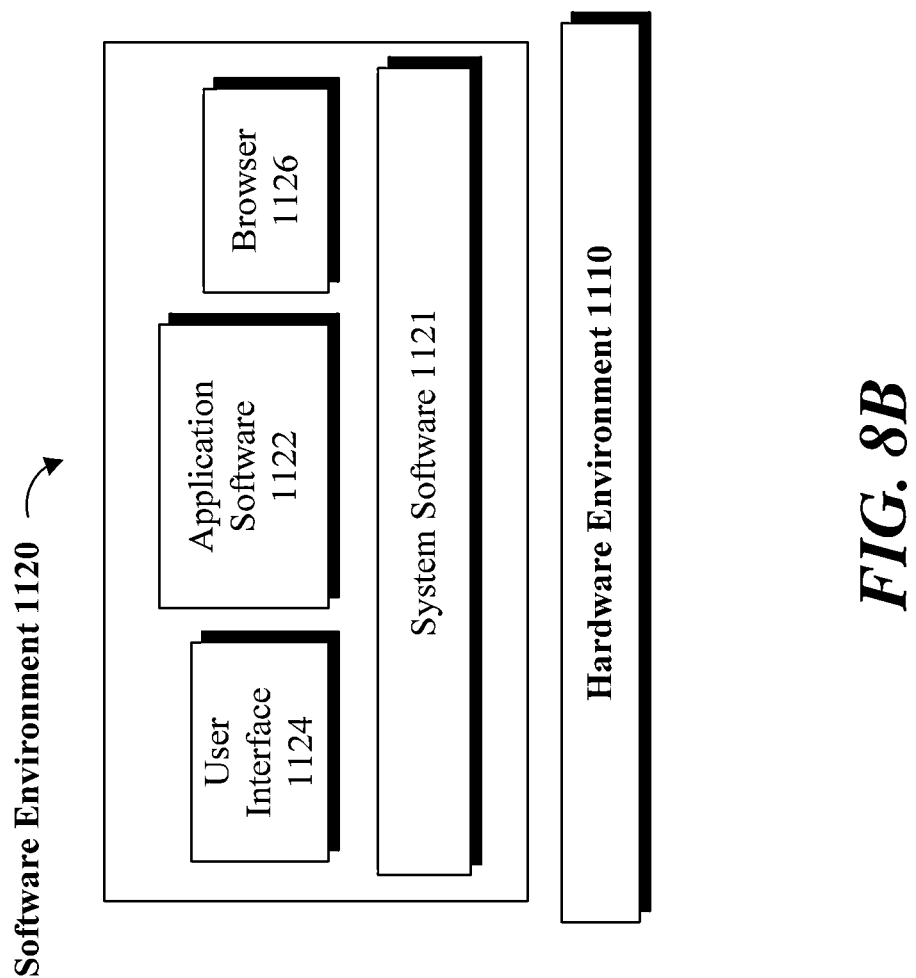

Referring to FIGS. 8A and 8B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 8A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-RAY), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 8B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A computer implemented cache optimization method comprising:

tracing objects instantiated during execution of a program code under test according to type of access by one or more threads running in parallel, wherein said tracing provides information about order in which different instances of one or more objects are accessed by said one or more threads and whether the type of access is a read operation or a write operation; and utilizing tracing information to build a temporal relationship graph (TRG) for the accessed objects which identifies false sharing (FS) threats, among other things, wherein the objects are represented by nodes in the TRG and at least two types of edges for connecting the nodes are defined;

wherein a first type of edge uni-directionally connects a first object to a second object to indicate that a thread accessed a first object and another thread wrote to the second object in a temporal proximity and so defines a FS threat, wherein a second type of edge non-directionally connects a first object to a second object to indicate that the first and the second objects were accessed in a temporal proximity by the same thread, or by a different thread but when neither access were a write access, wherein a weight is assigned to the edge of the first type, and said weight is incremented each time one thread accesses the first object and another thread writes to the second object, and wherein a weight is assigned to the edge of the second type, and said weight is incremented each time the first and second objects are accessed in said temporal proximity.

2. The method of claim 1 further comprising:

processing the nodes in the TRG to determine which objects are to be allocated to different cache lines, and which objects are to be allocated to the same cache lines, wherein objects that are connected by way of a first edge type and carry a weight above a first threshold can cause FS event and are allocated to different cache lines, and wherein objects that are connected by way of a second edge type are allocated to the same cache line.

3. The method of claim 2 further comprising creating a memory trace by way of instrumentation of the program code under test, wherein the memory trace traces the objects instantiated during the execution of the program code under test by creating records for each thread operation that accesses the objects.

4. The method of claim 3, wherein each record comprises a target address, type of access, and a thread ID.

5. The method of claim 3, wherein the target address provides information about location of the object accessed.

6. The method of claim 3, wherein the type of access indicates whether the thread operation involved a read or a write operation.

7. The method of claim 3 further comprising adding the records to a data structure to serialize the records for processing.

8. The method of claim 7, wherein the serialized records in the data structure are processed based on information included in a symbol table to generate an object trace from the serialized records in the data structure.

9. The method of claim 7, wherein granularity of an object in the trace is reduced to a cache-line-size chunk if the object is larger than a cache line.

10. The method of claim 9 further comprising generating a simulated cache based on the object trace, wherein the tracing information is included in the simulated cache from which the TRG is built.

11. A system for cache optimization, the system comprising:
one or more processors in communication with one or more data storage media;
a logic unit for tracing objects instantiated during execution of a program code under test according to type of access by one or more threads running in parallel, wherein said tracing provides information about order in which different instances of one or more objects are accessed by said one or more threads and whether the type of access is a read operation or a write operation;
a logic unit for utilizing tracing information to build a temporal relationship graph (TRG) for the accessed objects, wherein the objects are represented by nodes in the TRG and at least two types of edges for connecting the nodes are defined;
wherein a first type of edge uni-directionally connects a first node to a second node to indicate that a thread accessed a first object and another thread wrote to the second object in a temporal proximity, signifying a potential FS event,
wherein a second type of edge non-directionally connects a first object to a second object to indicate that the first and the second objects were accessed in temporal proximity by the same thread,
wherein a weight is assigned to the edge of the first type, and said weight is incremented each time one thread accesses the first object and another thread writes to the second object, and
wherein a weight is assigned to the edge of the second type, and said weight is incremented each time the first and second objects are accessed in temporal proximity.

12. The system of claim 11 further comprising:
a logic unit for processing the nodes in the TRG to determine which objects are to be allocated to different cache lines, and which objects are to be allocated to the same cache lines, in order to minimize the performance cost of potential FS,
wherein objects that are connected by way of a first edge type and carry a weight above a first threshold are allocated to different cache lines, and
wherein objects that are connected by way of a second edge type are allocated to the same cache line.

13. The system of claim 12 further comprising creating a memory trace by way of instrumentation of the program code under test, wherein the memory trace traces the objects instantiated during the execution of the program code under test by creating records for each thread operation that accesses the objects.

14. The system of claim 13, wherein each record comprises a target address, type of access, and a thread ID.

15. The system of claim 13, wherein the target address provides information about location of the object accessed.

16. The system of claim 13, wherein the type of access indicates whether the thread operation involved a read or a write operation.

17. The system of claim 13, wherein the thread ID identifies the thread that accesses the object.

18. The system of claim 13 further comprising adding the records to a data structure to serialize the records for processing.

19. The system of claim 18, wherein the serialized records in the data structure are processed based on information included in a symbol table to generate an object trace from the serialized records in the data structure.

20. The system of claim 19 further comprising generating a simulated cache based on the object trace, wherein the tracing information is included in the simulated cache from which the TRG is built.

21. A non-transitory computer readable storage medium having a computer readable program, wherein the computer readable program when executed on a computer causes the computer to:
trace objects instantiated during execution of a program code under test according to type of access by one or more threads running in parallel, wherein said tracing provides information about order in which different instances of one or more objects are accessed by said one or more threads and whether the type of access is a read operation or a write operation;
utilize tracing information to build a temporal relationship graph (TRG) for the accessed objects, wherein the objects are represented by nodes in the TRG and at least two types of edges for connecting the nodes are defined;
wherein a first type of edge uni-directionally connects a first node to a second node to indicate that a thread accessed a first object and another thread wrote to the second object in a temporal proximity,
wherein a second type of edge non-directionally connects a first object to a second object to indicate that the first and the second objects were accessed in temporal proximity by the same thread,
wherein a weight is assigned to the edge of the first type, and said weight is incremented each time one thread accesses the first object and another thread writes to the second object, and
wherein a weight is assigned to the edge of the second type, and said weight is incremented each time the first and second objects are accessed in temporal proximity.

22. The computer program product of claim 1 wherein the computer readable program when executed on the computer further causes the computer to:
- process the nodes in the TRG to determine which objects are to be allocated to different cache lines, and which objects are to be allocated to the same cache lines,
- wherein objects that are connected by way of a first edge type and carry a weight above a first threshold are allocated to different cache lines, and
- wherein objects that are connected by way of a second edge type are allocated to the same cache line.

23. The computer program product of claim 22 wherein the computer readable program when executed on the computer further causes the computer to create a memory trace by way of instrumentation of the program code under test, wherein the memory trace traces the objects instantiated during the execution of the program code under test by creating records for each thread operation that accesses the objects.

24. The computer program product of claim 23, wherein each record comprises a target address, type of access, and a thread ID.

25. The computer program product of claim 23, wherein the target address provides information about location of the object accessed.

* * * * *